US005802385A

United States Patent [19]

Densham et al.

[11] Patent Number: 5,802,385

[45] Date of Patent: Sep. 1, 1998

[54] ARRAY PROCESSING SYSTEM WITH EACH PROCESSOR INCLUDING ROUTER AND WHICH SELECTIVELY DELAYS INPUT/OUTPUT OF INDIVIDUAL PROCESSORS IN RESPONSE DELAY INSTRUCTIONS

[75] Inventors: Rodney Hugh Densham, Charlbury; Peter Charles Eastty, Oxford; Conrad Charles Cooke, Witney, all of United Kingdom

[73] Assignees: Sony Corporation, Tokyo, Japan; Sony United Kingdom Limited, Weybridge, England

[21] Appl. No.: 515,837

[22] Filed: Aug. 16, 1995

[30] Foreign Application Priority Data

Sep. 21, 1994 [GB] United Kingdom .................. 9419041

[51] Int. Cl.$^6$ .......................... G06F 15/80; G06F 15/82

[52] U.S. Cl. .......................... 395/800.16; 395/800.18

[58] Field of Search .......................... 395/800, 800.16, 395/800.18, 800.22

[56] References Cited

U.S. PATENT DOCUMENTS

| | | | |
|---|---|---|---|
| 3,984,819 | 10/1976 | Anderson | 395/311 |
| 5,408,646 | 4/1995 | Olnowich | 395/575 |
| 5,421,019 | 5/1995 | Holsztynski | 395/800 |
| 5,437,049 | 7/1995 | Carlstedt | 395/800 |
| 5,574,849 | 11/1996 | Sonnier | 395/182.1 |
| 5,613,136 | 3/1997 | Cassavant | 395/800 |

FOREIGN PATENT DOCUMENTS 2 223 867 4/1990 United Kingdom .

*Primary Examiner*—Eric Coleman

*Attorney, Agent, or Firm*—Frommer Lawrence & Haug LLP; William S. Frommer

[57] ABSTRACT

In one aspect, the invention provides parallel processing apparatus comprising an array of data processors 4. arranged to operate synchronously, and a plurality of data buses. Each data processor 4 has first and second I/O means 16H, 16V for transfer of data between the processor 4 and respective data buses H,V a plurality of processors 4 being connected to each of the data buses H,V and each processor 4 being connected, via said I/O means 16H, 16V, to a different pair of data buses H,V. Each processor 4 includes selectively operable routing means 32H, 32V for interconnecting the first and second I/O means 16H, 16V to transfer data between the buses H,V connected thereto.

31 Claims, 11 Drawing Sheets

| TICK NO | SPIC A | H BUS | SPIC C |
| --- | --- | --- | --- |
| 0 | INSTN 0 (OUT H) | | INSTN 0 (IN H) |
| 1 | Add Calc | | P2 |
| 2 | Data Read | | P3 |
| 3 | H OUT Reg | | P4 |
| 4 | | ✓ | (P5) |
| 5 | | | H IN Reg |
| 6 | | | Parity Check |
| 7 | | | Data Write |

FIGURE 5

| TICK NO | SPIC A | H BUS | SPIC C | V BUS | SPIC D |
|---|---|---|---|---|---|
| 0 | INSTN 0 (OUT H) | | INSTN 0 [H-V BIT SET] | | |
| 1 | Add Calc | | | | INSTN 1 (IN V) |
| 2 | Data Read | | | | P2 |
| 3 | H OUT Reg | | | | P3 |
| 4 | | ✓ | | | P4 |
| 5 | | | Route H→V | ✓ | (P5) |
| 6 | | | | | H IN Reg |
| 7 | | | | | Parity Check |
| 8 | | | | | Data Write |

*FIGURE 7*

| INSTN/ TICK NO | SPIC A ODV | SPIC A Resource | V BUS Resource | SPIC B IDV | SPIC B Resource |
|---|---|---|---|---|---|
| n | 0 | | | 0 | |
| +1 | 1 | OUT | | 0 | |
| +2 | 1 | | | 0 | |
| +3 | 1 | | | 0 | |
| +4 | 0 | | | 1 | |
| +5 | 0 | * | | 1 | |
| +6 | 0 | | | 1 | |
| +7 | 0 | | | 0 | IN |
| +8 | 0 | | FREE | 0 | |
| +9 | 0 | | | 0 | |
| +10 | 0 | | | 0 | |
| +11 | 0 | | | 0 | * |

*FIGURE 8*

ARRAY PROCESSING SYSTEM WITH EACH PROCESSOR INCLUDING ROUTER AND WHICH SELECTIVELY DELAYS INPUT/OUTPUT OF INDIVIDUAL PROCESSORS IN RESPONSE DELAY INSTRUCTIONS

BACKGROUND OF THE INVENTION

1. Field of the Invention

The present invention relates generally to data processing systems, and the various aspects of the invention find particular, though not exclusive, application in the field of digital audio data processing such as may be performed by the signal processing rack in an audio recording studio.

2. Description of the Prior Art

In an audio recording studio, as illustrated by the simplified block diagram of FIG. 1, the signal processing rack 1 communicates with an operator console 2 and, as indicated by the LINK & I/O block 3, is also connected into the studio network for communication of audio and control data between the signal processing rack and the various input/output devices, e.g. speakers, microphones, DATs etc., connected to the network link. Operation of the network is controlled at the console, or mixing desk, 2, communication of data between devices in the network and implementation of the necessary processing by the signal processing rack being performed in response to operation of the console controls.

The signal processing rack 1 can be considered to be divided into a control side, which is responsive to the status of the various controls on the console 2, and an audio processing side which implements the required audio processing functions in dependence upon the control settings and communicates audio data with the network devices via the link.

In a previously proposed signal processing rack 1, the processing of digital audio data is performed by a parallel processing array as illustrated schematically in FIG. 2 of the accompanying drawings. FIG. 2 shows an array of eight signal processing integrated circuits (SPICs) 4 labelled A to F. The processors 4 are arranged, at least electrically, in a rectangular array, each SPIC being connected to a horizontal data bus H and a vertical data bus V. Each SPIC 4 is arranged for communication of data with each of the two buses to which it is connected. As illustrated, each of the horizontal and vertical buses H,V is shared by a number of SPICs 4, but each SPIC in the figure is connected to a different pair of buses.

The parallel processing array as a whole of course consists of a substantially greater number of SPICs than shown in FIG. 2. The SP rack 1 in fact includes up to 16 cards, each card carrying an array of, for example, eight SPICs, the horizontal and vertical buses being connected between cards, so that, electrically, the SPICs form one large rectangular array. The buses may in fact be connected in a loop, with periodic pipeline registers, for example every four cards, to allow bi-directional communication around the loop and extend the processing power of the array.

The SPICs 4 in the array run synchronously, each SPIC performing a sequence of operations in each audio sample period in accordance with an instruction sequence stored in an internal memory. The SPICs are pre-programmed with the instruction sequences at set-up so that all possible required processing operations can be implemented by the array. In operation, the SPICs run synchronously through their instruction sequences under control of a control processor (not shown) which is responsive to the operator console 2 to cause the SPICs to implement the various processing operations as required.

It is of course desirable for the processing array to be as efficient as possible. However, in implementing the required processing operations, there are numerous constraints which can lead to significantly reduced processing efficiency of the array as a whole. For example, referring again to FIG. 2, in this system, if, in order to implement a required process, SPIC A needs to communicate data with SPIC D which is not on the same horizontal or vertical bus, this must be achieved via one of the two SPICs, SPIC B or SPIC C, which share a bus with each of SPICs A and D. Assuming SPIC C is selected, the transfer requires SPIC A to output the data to the horizontal bus shared with SPIC C, SPIC C to read the data from the horizontal bus to memory, SPIC C then to output the data to the vertical bus shared with SPIC D, and SPIC D to read the data from the vertical bus. Such transfers are inherently slow and are wasteful of the processing resources of the SPICs.

In general, all bus transfers occur at pre-arranged times in the audio sample period and it will be appreciated that the task of selecting those transfer times at the programming stage can be extremely complicated. Since the array runs synchronously, only one of the SPICs connected to a given bus can output data to that bus in a given cycle of the synchronous clock. Thus, for any data transfer between SPICs, the transfer must be scheduled at a time convenient to the sending SPIC, the receiving SPIC, and all other SPICs connected to that bus. These constraints can severely limit the efficiency of the processing array.

SUMMARY OF THE INVENTION

Aspects of the present invention relate to improvements in data processing systems, particularly to audio data processing systems of the type described above though the invention can of course be applied to advantage in other data processing systems where similar considerations arise.

According to one aspect of the present invention there is provided parallel processing apparatus comprising an array of data processors, arranged to operate synchronously, and a plurality of data buses, each data processor having first and second I/O means for transfer of data between the processor and respective data buses, a plurality of processors being connected to each of the data buses and each processor being connected, via said I/O means, to a different pair of data buses, wherein each processor includes selectively operable routing means for interconnecting the first and second I/O means to transfer data between the buses connected thereto.

According to another aspect of the invention there is provided parallel processing apparatus comprising an array of data processors arranged to operate synchronously in accordance with a clock signal, each processor having data I/O means connecting the processor to at least one data bus to which a plurality of the processors are connected, and each processor being arranged to perform a sequence of operations in accordance with a sequence of instructions stored in a program memory of the processor, wherein each processor includes selectively operable output delay means for delaying data supplied to the I/O means following a said instruction to output that data to the bus until a cycle of the clock signal when the bus is free.

According to another aspect of the invention there is provided parallel processing apparatus comprising an array of data processors arranged to operate synchronously in accordance with a clock signal, each processor having data I/O means connecting the processor to at least one data bus to which a plurality of said processors are connected, and each processor being arranged for performing a sequence of operations in accordance with a sequence of instructions stored in a program memory of the processor, wherein each processor includes selectively operable input delay means for delaying data supplied by the bus to the I/O means until input of that data can be effected by a said instruction.

In embodiments of the invention, a plurality of the data processors may share an external memory having an address port, a data port and control inputs, each processor sharing the memory having data and address outputs connected to the data and address ports of the memory and a memory controller, having control outputs connected to the control inputs of the memory, for controlling accessing of the memory by that processor, wherein the processors sharing the memory are configured to access respective different address areas of the memory, and wherein the memory controller of each processor is arranged to disable the data, address and control outputs to the memory after operation thereof during a memory access by that processor. Tri-state buffers may be connected in the data, address and control outputs for disabling the outputs under control of the memory controller.

Data processing apparatus may embody one or more of the various aspects of the invention. Further, where features are described herein with reference to an apparatus embodying the invention, corresponding features may be provided in accordance with a method of the invention, and vice versa.

BRIEF DESCRIPTION OF THE DRAWINGS

The above and other objects, features and advantages of the invention will be apparent from the following detailed description of illustrative embodiments which is to be read in connection with the accompanying drawings, in which:

FIG. 5 illustrates diagrammatically the process of data transfer between SPICs sharing a data bus in embodiments of the present invention;

FIG. 7 illustrates diagrammatically the process of data transfer between SPICs not sharing a data bus in preferred embodiments of the invention;

FIG. 8 is a diagram illustrating output and input delay functions of preferred embodiments of the invention;

DESCRIPTION OF THE PREFERRED EMBODIMENTS

Figure 2:
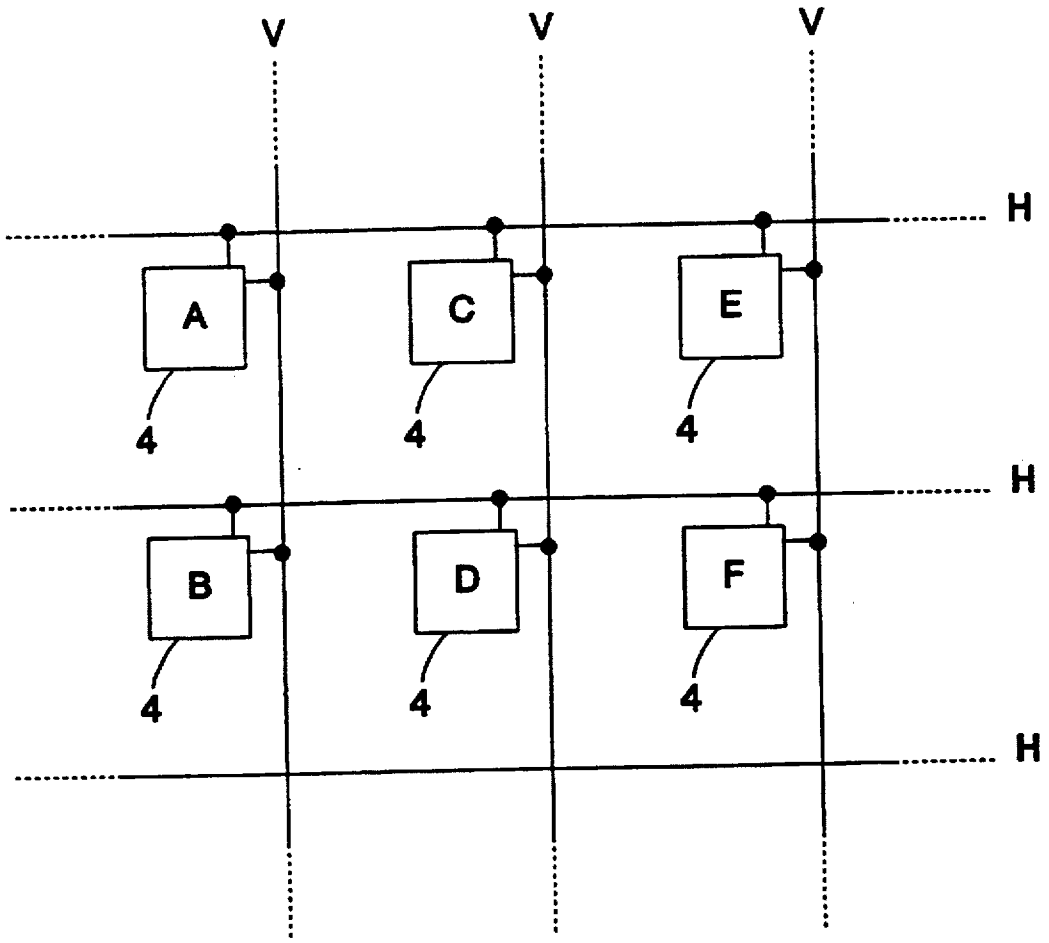
FIG. 2 is schematic illustration of a parallel processing array.
Figure 3A:
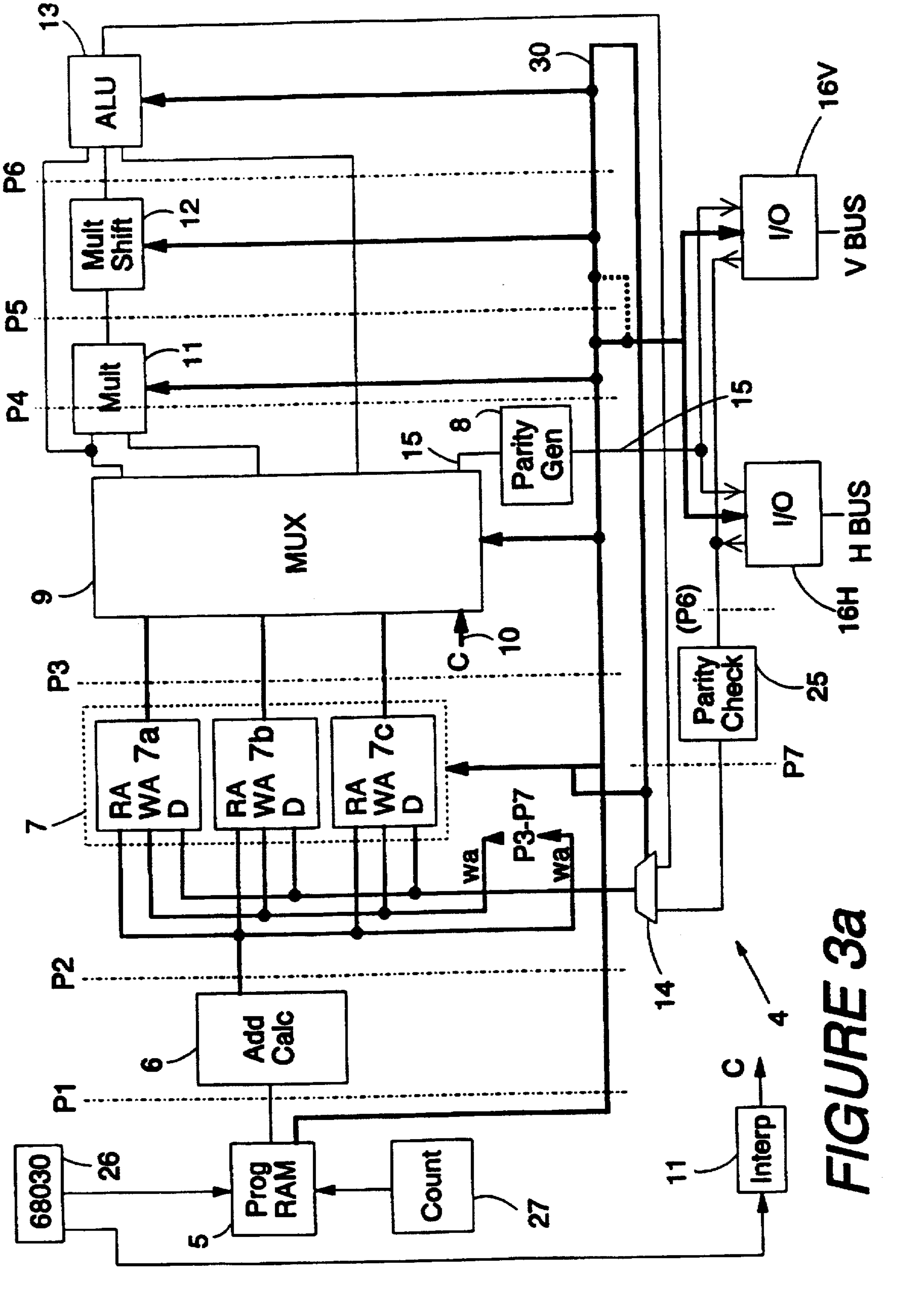
FIG. 3*a* is a simplified block diagram illustrating the general structure of a SPIC.

FIG. 3*a* is a simplified block diagram showing the general structure of a processor, or SPIC, 4 which may be used in a parallel processing array as illustrated in FIG. 2 and to which the present invention can be applied. Before describing preferred embodiments of the invention in detail, the basic structure and operation of the SPIC 4 will be described.

The SPIC 4 comprises a program RAM 5 in which the instruction sequence for controlling operation of the SPIC is stored. The program RAM 5 is connected to an address calculator 6 which generates the address inputs for a data RAM section, indicated generally at 7, comprising three data RAMs 7*a*, 7*b* and 7*c* with respective read and write address inputs RA and WA and data inputs D. The three data outputs from the data RAMs 7 form three of the four inputs to an arrangement of multiplexers indicated generally by the MUX block 9. The fourth input 10 of the MUX block 9 receives coefficients (c) from an interpolator 11, provided separately of the processor 4, as discussed further below. The MUX block 9 is arranged to enable connection of any of its four inputs to any of its four outputs in dependence on the instruction being performed. The upper two outputs of the multiplexers 9 form the two inputs to a multiplier (mult) 11 the output of which is connected to a multiplier shifter (mult shift) 12 which performs bit shifting of the multiplier output. (For example, if the inputs to the multiplier 11 are 32 bits wide, the multiplier output can be up to 64 bits, and the multiplier shifter 12 selects the required 32 bits to be supplied to its output in accordance with the instruction being performed). The output of the multiplier shifter 12 is supplied to an arithmetic logic unit (ALU) 13. One input of the multiplier 11 is also connected directly to an input of the ALU 13, as is the third output of the multiplexers 9. The output of the ALU 13 is connected to one input of a multiplexer 14 the output of which is connected to the data inputs D of the three data RAMs 7*a*, 7*b* and 7*c*.

The fourth output 15 of the multiplexers 9 is connected via a parity generator 8, which generates parity bits for outgoing data, to first and second I/O (input/output) means 16H and 16V. The I/O means 16H, 16V connect the processor for data transfer with the horizontal and vertical data buses H,V respectively. As shown in more detail in FIG. 3*b*, I/O sections 16H, 16V comprise respective output data paths 17H, 17V and respective input data paths 18H and 18V. The output 15 of the multiplexers 9 is connected to the output data paths 17H and 17V. Connected in the output data path 17V is a register (V OUT REG) 19V and an output driver 20V, the output of which is connected to the vertical bus (V BUS). On the input data path 18V, the vertical bus is connected via an input buffer 21V to a register (V IN REG) 22V. The data paths 17H and 18H of the I/O section 16H are connected to the horizontal bus (H BUS) and are similarly coinstructed with corresponding registers H OUT REG and H IN REG, 19H and 22H, an output driver 20H and an input buffer 21H. The outputs of the registers 22H and 22V in the input data paths are connected to a parity check unit 25 in which parity checking of data received from the buses is performed. The output of the parity check unit 25 forms a second input to the multiplexer 14.

Figure 1:
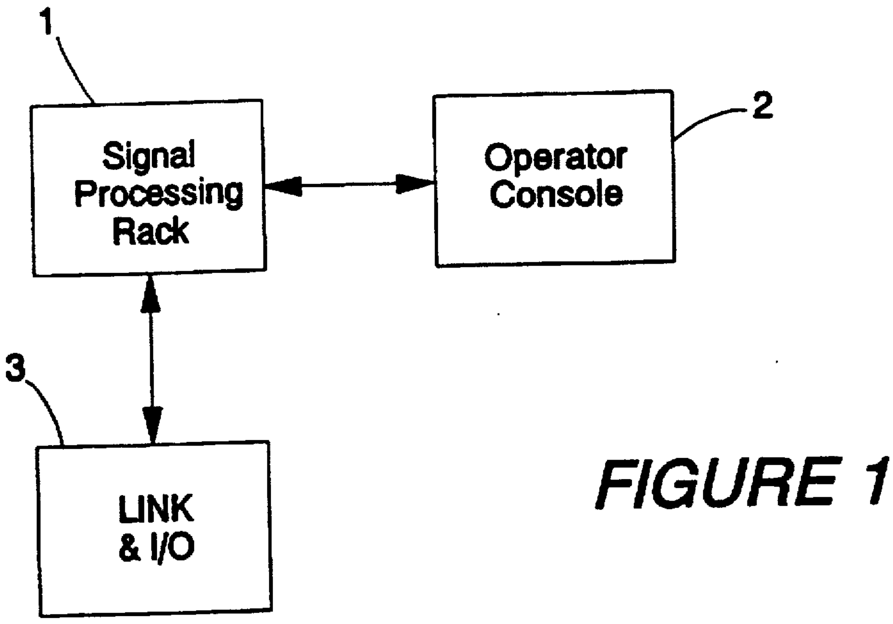
FIG. 1 is a schematic block diagram of a digital audio data processing system.

As previously described, each SPIC 4 in the array (FIG. 2) is programed at set-up to perform a sequence of operations in each audio sample period in accordance with a sequence of instructions stored in the program RAM 5. In the embodiments to be described, each SPIC 4 can implement 512 such instructions per audio sample period. During set-up, the instructions are written to the program RAMs 5 via a control processor, in this example a 68030 processor 26, of which there may be one per card of the signal processing rack 1 (FIG. 1). In operation, the 512 instructions are sequentially read out of the program RAM 5 in accordance with the clock signal from a counter 27 which generates 512 clock cycles, or "ticks", per audio sample period.

All counters 27 are synchronised and triggered to start the tick count by a global "start sample clock" which runs at the audio sampling frequency. Thus, all SPICs in the array progress synchronously through their respective instruction sequences during each audio sample period.

The parallel processing array as a whole provides for implementation of all possible processing functions that may be required depending on the set-up of the studio network and the control settings at the operator console 1. To switch in or out a particular function, or to alter the routing of data, the control processor 26 can write directly to the program RAM 5 to change access addresses for the data RAMs 7. For example, to switch in or out a given function, the address accessed by an instruction corresponding to that function can be changed from an address containing processed data to be used when the function is active, to an address containing unprocessed data to be used when the function is switched out.

The control processor 26 is also connected to a coefficient interpolator 11 which generates coefficients (c) to be used in the processing operation of the SPIC. For example, as console controls such as faders etc. are adjusted by an operator, it is necessary to vary the characteristics, such as signal levels etc., of audio signals. This can be achieved by, for example, multiplying the audio sample data by a coefficient the value of which corresponds to the setting of the console control. Control data is therefore supplied by the control processor 26 to the interpolator 11 in dependence upon the status of the console controls. However, since the sampling frequency of the digital control signals supplied to the control processor 26 is generally much lower than the audio sampling frequency, for example 1 kHz for the control signals as compared with 48 kHz for the audio signals, interpolation is required to generate appropriate coefficients for the multiple audio samples within one period of the control signal sampling frequency. It is this interpolation which is performed by the coefficient interpolator 11 in dependence upon the control data from the control processor 26. In general, coefficients are generated at half the tick rate, so that each coefficient is valid for two successive ticks. The coefficient sample rate can, however, be adjusted if required for certain functions, such as for cross-fades. Coefficients (c) output by the interpolator 11 are supplied to the input 10 of the multiplexers 9.

Figure 4A:
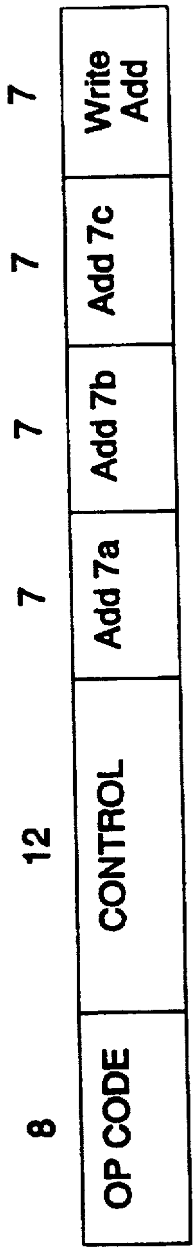
FIG. 4*a* illustrates the format of an instruction word for the SPIC of FIG. 3*a* in accordance with the previous proposal.

FIG. 4a illustrates schematically the format of the instruction word for the instructions stored in the program RAM 5 in the previously proposed system. This instruction word is 48 bits long. The first eight bits of the instruction word form the operation code (OP CODE) which indicates the type of instruction, e.g. add data in two of the data RAMs 7, multiply data in one of the data RAMs by a coefficient, and so on. The next 12 bits of the instruction word constitute control data for controlling the internal operation of the SPIC, e.g. for controlling switching in the MUX block 9 and multiplexer 14, enabling of the data RAMs 7, I/O accesses, including enabling of the output drivers 20H, 20V in the I/O sections 16H, 16V, and so on. The next 28 bits of the instruction word are divided into four 7-bit address fields. The first three address fields represent read addresses for the three data RAMs 7a, 7b and 7c. The last address field represents a write address for writing data to one or more of the data RAMs 7.

Referring again to FIG. 3a, as each instruction word is read out of the program RAM 5, the addresses are supplied to the address calculator 6 which decodes the read and write addresses for the data RAMs 7. The remaining instruction data is output to the control line 30 which is shown in bold in FIG. 3a. The control line 30 is shown connected to the data RAMs 7, MUX block 9, multiplier 11, multiplier shifter 12, ALU 13, I/O sections 16H, 16V and the multiplexer 14 to control operation of these components in accordance with the instruction word. (The section of the control line 30 shown by a broken line in the figure is present in preferred embodiments of the invention which will be described in detail hereinafter).

The internal hardware of the SPIC 4 is highly pipelined. The pipeline registers are indicated schematically by the dash-dotted lines in FIG. 3a and are labelled P1 to P7. These divide the data and control paths from the program RAM 5, via the data RAMs 7, MUX block 9, ALU 13, and multiplexer 14 back to the data RAMs 7 into eight pipeline stages 0 to 7 as follows:

| Pipeline Stage | Action |
|---|---|
| 0 | Program read |
| 1 | Address calculation |
| 2 | Data read |
| 3 | Multiplier 1 |
| 4 | Multiplier 2 |
| 5 | Multiplier shift |
| 6 | ALU |
| 7 | Data write |

Each pipeline stage 0 to 7 corresponds to one tick of the counter 27 which triggers reading of successive instructions from the program RAM 5. Thus, at tick 0 at the start of an audio sample period, instruction 0 is read out of the program RAM 5 to the pipeline register P1. In the next tick, instruction 1 is read out of the program RAM 5 to the pipeline register P1 as address calculation for instruction 0 is performed by the address calculator 6. In successive ticks after this, successive instructions are read out of the program RAM 5 as the instruction data for instruction 0, and data generated by this instruction, propagate through the internal pipeline stages. Note that read addresses generated by the address calculator 6 in pipeline stage 1 are used in the immediately following pipeline stage to access the data RAMs 7, whereas write addresses (wa) generated in pipeline stage 1 are not required until pipeline stage 7. As indicated schematically in FIG. 3a, therefore, write addresses wa are supplied on an extension of the address line from pipeline register P2, on through pipeline registers P3 to P7, and appear on the write address inputs WA of the data RAMs 7 in pipeline stage 7.

Consider for example an instruction requiring multiplication of data at specified addresses in data RAMs 7a and 7b, and writing of the product to a specified address in data RAM 7c. The operation is as follows. In the first tick, the instruction is read out of the program RAM 5. In the second tick, the read addresses for data RAMs 7a and 7b and the write address for data RAM 7c are generated by the address calculator 6. In the third tick, the read addresses are supplied to the data RAMs 7a, 7b which are enabled by the instruction word on the control line 30 so that the appropriate data samples are read out to pipeline register P3. The write address for data RAM 7*c* is passed on to pipeline register P3 on the address line extension and propagates through the following pipeline stages with successive ticks. In the fourth tick, the MUX block 9 is controlled to supply the data samples read from the data RAMs to the two inputs of the multiplier 11 which then performs the first stage of the multiplication processing. In the fifth tick, the multiplier 11 performs the second stage of the multiplication processing and supplies the product to the pipeline register P5. Bit-shifting of the product is performed by the multiplier shifter in tick 6 under control of the instruction word, and the result is supplied to the pipeline register P6. In the seventh tick, the product is supplied via the ALU 13 to the pipeline register P7. In the eighth tick, the write address wa is supplied to the data RAMs 7 and the multiplexer 14 is controlled to supply the output from the ALU 13 to the data RAMs. During this stage, data RAM 7*c* is enabled by the control data in the instruction word, whereby the product is written to the appropriate address in this data RAM and the operation is complete.

It will be seen from the above that if instruction 0, read in tick 0, generates a variable X, the data is not written to the data RAMs 7 until the end of tick 7. Thus, the variable X is not available to be used by any other instruction until tick 8. Since an instruction read from the program RAM 5 in tick n can read data from the data RAMs 7 in tick n+2, the first instruction that can use the variable X is instruction 6 which is read from the program RAM 5 in tick 6.

Transfers between SPICs 4 using the H or V buses occur with normal pipeline timing. Thus, if instruction 0 in tick 0 requires the output of data to one of the buses, the data will be supplied to the I/O sections 16H, 16V on the output 15 of the MUX block 9 in tick 3. At the end of this tick, the data will be stored in the output registers 19H and 19V of the I/O sections which therefore correspond to equivalent pipeline registers P4 as indicated in brackets in FIG. 4*b*. In tick 4, control data in the instruction word enables the appropriate one of the output drivers 20H, 20V via the control line connection to the output sections so that the data will be present on the H or V bus in tick 4.

Figure 3B:
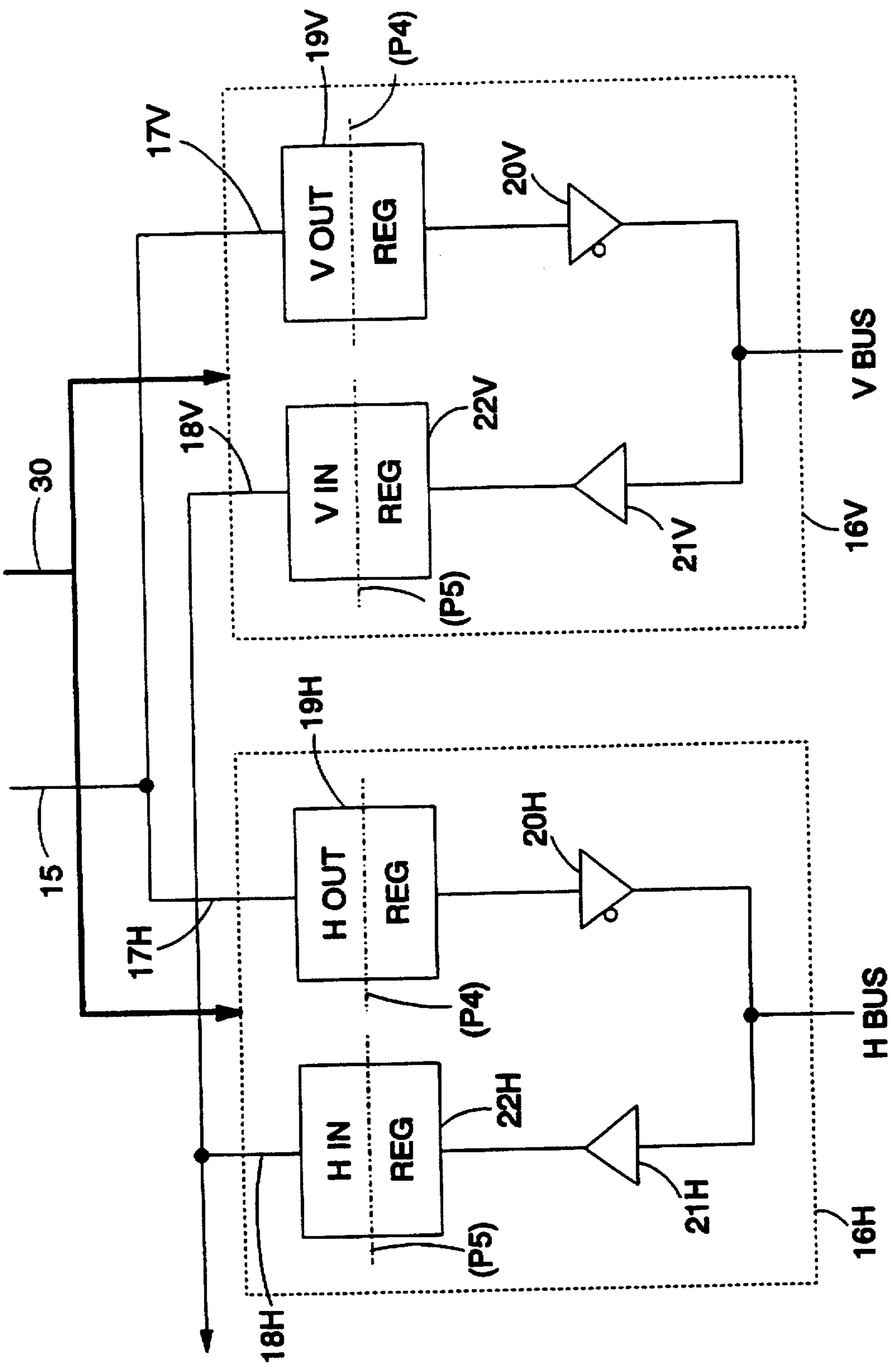
FIG. 3*b* shows part of FIG. 3*a* in more detail.

Similarly, for a data input instruction in tick 0, the data will be supplied from the bus to the appropriate one of the input registers 22H and 22V in the I/O sections in tick 4, so that these input registers correspond to equivalent pipeline registers P5 as indicated in brackets in FIG. 3*b*. In tick 5, the data will be output by the input registers to equivalent pipeline register (P6). In tick 6, parity checking is performed, and in tick 7 the data is supplied by the multiplexer 14 to the appropriate one of the data RAMs 7.

FIG. 5 illustrates diagrammatically the process of communication between two SPICs on the same bus, here SPICs A and C in FIG. 2. In this example, data is to be transferred from SPIC A to SPIC C. In tick 0, instruction 0 is read out of the program RAM 5 in SPIC A specifying output of data from a specified address in one of the data RAMs 7 to the H bus. In the same tick, tick 0, instruction 0 is read out from the program RAM 5 of SPIC C and specifies the input of data from the H bus to a specified address in one of its data RAMs 7. In tick 1, read address calculation is performed by the address calculator 6 in SPIC A and write address calculation is performed by the address calculator 6 in SPIC C. In tick 2, the data is read out from the appropriate address in one of the data RAMs 7 in SPIC A, and the input instruction is supplied to the pipeline register P3 in SPIC C. In tick 3, the data is supplied to the output register 19H in the I/O section 16H of SPIC A and the input instruction is supplied to pipeline register P4 in SPIC C. In tick 4, the output driver 20H in SPIC A is enabled to output the data to the H bus, and the data is received by the input register 22H (corresponding to equivalent pipeline register (P5)) in the I/O section 16H of SPIC C. In tick 5, the data is supplied by the register 22H in SPIC C to the equivalent pipeline register (P6). In tick 6, parity checking is performed by the parity check unit 25 in SPIC C. In tick 7, the data is written to the specified address in one of the data RAMs 7 in SPIC C.

As illustrated above, communication between two SPICs on the same data bus takes a total of eight ticks. In accordance with the previous proposal as mentioned earlier, to achieve communication between two SPICs, e.g. SPIC A and SPIC D in FIG. 2, which do not share a data bus, the data must first be transferred from SPIC A to one of SPICs B and C and then from that SPIC to SPIC D. This requires a total of four instructions: an OUT instruction in SPIC A, an IN instruction in SPIC C (or B); an OUT instruction in SPIC C (or B); and finally an IN instruction in SPIC D. From FIG. 5 it will be seen that if the OUT instruction in SPIC A is instruction 0, read out in tick 0, the data is written into data RAM in SPIC C in tick 7 and so is not available to be read by an OUT instruction in SPIC C until tick 8. This means that the earliest instruction in SPIC C which can output that data is instruction 6, read in tick 6, and the data will not actually be written to the data RAM in SPIC D until tick 13. Communication between SPICs on different buses therefore takes a minimum of 14 ticks and utilises two instructions and a data RAM location in the "intermediate" SPIC (SPIC C in the above example) solely for the purpose of the transfer. The transfer process is therefore slow and is wasteful of the processing resources of the SPICs.

Figure 4B:
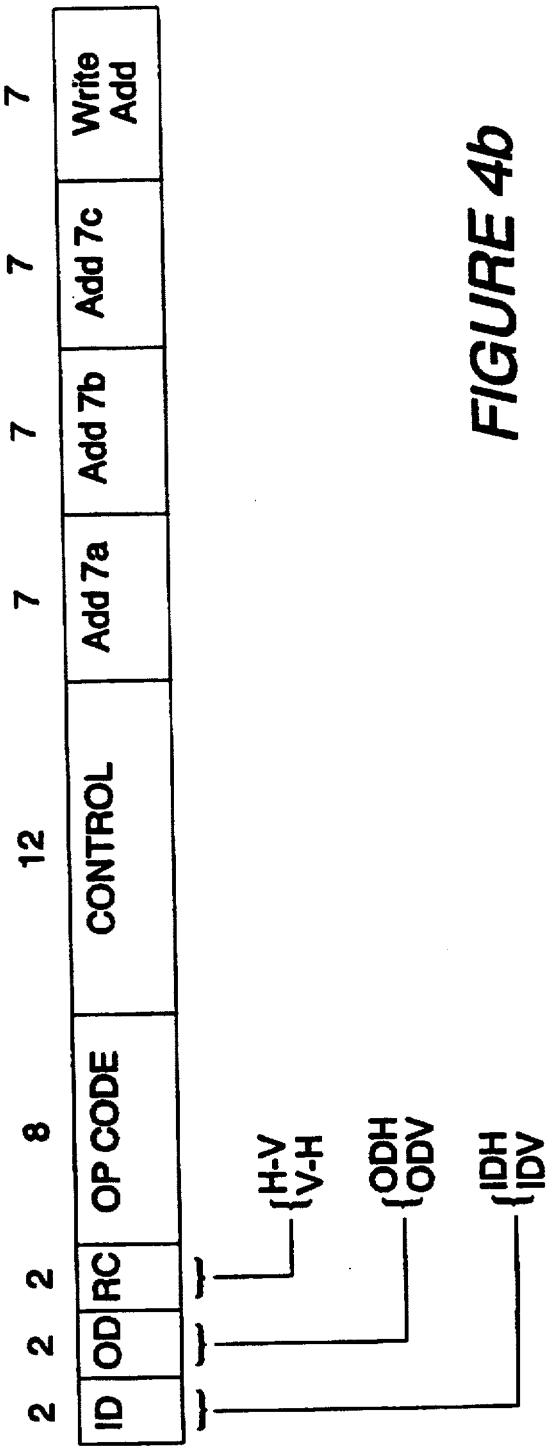
FIG. 4*b* illustrates the instruction word format in a particularly preferred embodiment of the present invention.

In preferred embodiments of the present invention, each SPIC 4 includes selectively operable routing means to allow connection of the input path 18 of one of the I/O sections 16H, 16V to the output data path 17 of the other I/O section. This allows data received from one of the buses to be transferred to the other bus without involving the main signal processing circuitry of the SPIC. To control the routing means, two routing control bits (RC) are added at the beginning of the instruction word as illustrated in FIG. 4*b*. One of these bits (H-V), controls interconnection of the input path from the H bus to the output path to the V bus, and the other bit (V-H) controls interconnection of the input path from the V bus to the output path to the H bus. These control bits propagate through the pipeline stages of the control bus 30 in FIG. 3*a* and are supplied to the I/O sections 16H, 16V from pipeline stage 5 as illustrated by the broken section of the control line 30 in FIG. 3*a*.

Figure 6:
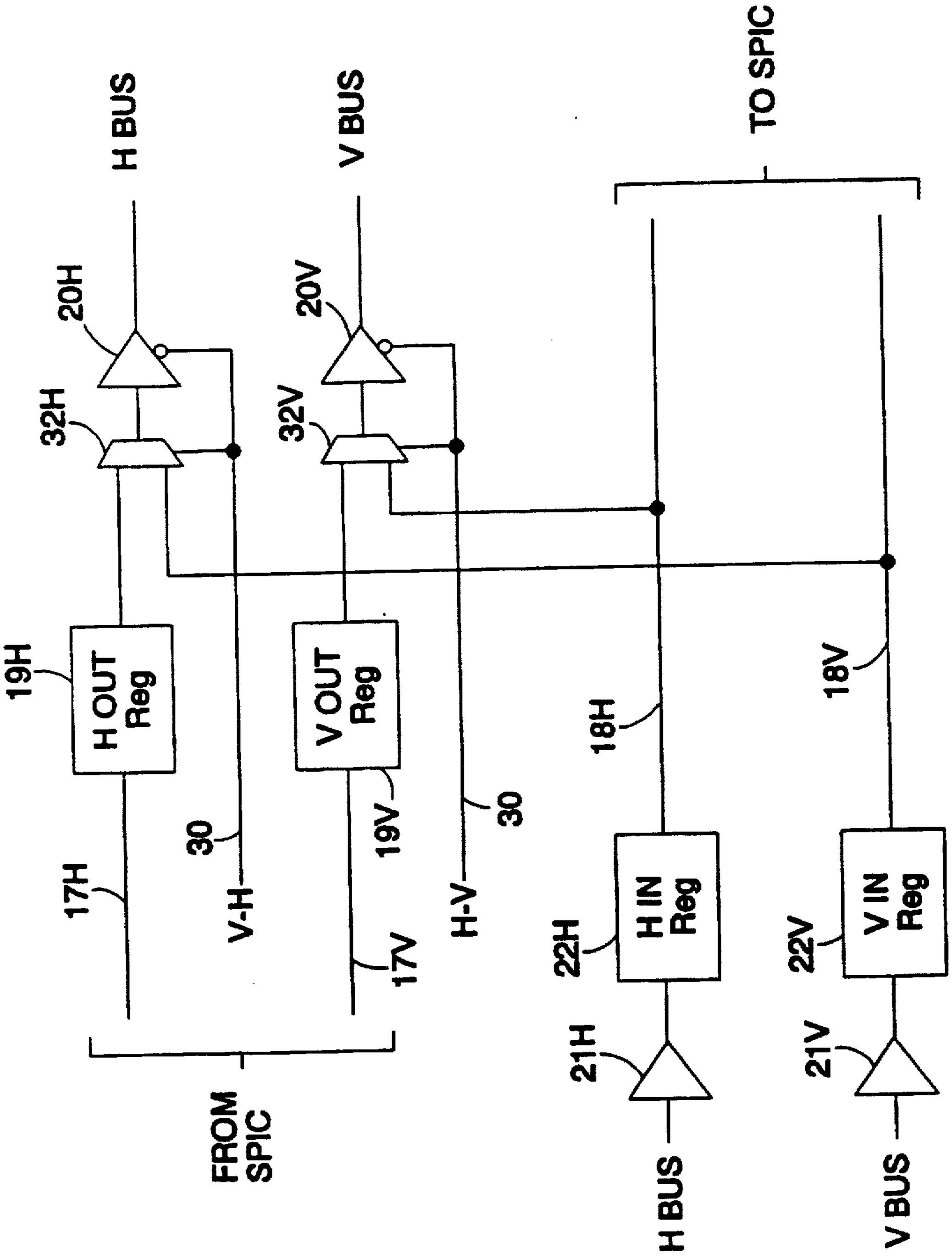
FIG. 6 illustrates in detail part of the structure of the SPIC of FIG. 3*a* for implementing the data transfer system of FIG. 7.

FIG. 6 shows in detail the arrangement of the I/O sections 16 for performing the selective routing functions. In FIG. 6, the data output paths 17H, 17V of the two I/O sections are grouped together, as the two input paths 18H, 18V, for ease of representation. In fact of course the input and output paths 17H and 18H are connected to the same H bus, and the input and output paths 17V and 18V are connected to the same V bus. As shown, respective multiplexers 32H and 32V are connected in the output paths 17H and 17V of the I/O sections 16 between the output registers 19 and the output drivers 20. The multiplexer 32H has one input connected to the output of the register 19H and another input connected to the output of the input register 22V in the input data path from the V bus. The output of the multiplexer 32H forms the input to the output driver 20H. Similarly, the multiplexer 32V has one input from the output register 19V and another input connected to the output of the input register 22H in the input data path from the H bus. The output of the multiplexer 32V forms the input to the output driver 20V.

A branch of the control line 30 is connected to the control input of the multiplexer 32H for supplying the V-H control bit thereto. This determines which of the multiplexer inputs is supplied to the output driver 20H. The V-H control bit is also supplied to the output driver 28 to serve as an OUT enable signal when required. Similarly, the H-V routing control bit is supplied to a control input of the multiplexer 32V and to the output driver 20V to control switching of the multiplexer and enabling of the output driver.

For normal I/O instructions, involving transfer of data to or from the internal processing circuitry of the SPIC, the routing control bits V-H, H-V will be zero, and the multiplexers 32H, 32V will connect the outputs of the registers 19H, 19V to the output drivers 20H, 20V. Thus, data can be input from either bus to the SPIC, via the input data paths 18H, 18V, and output from the SPIC via the output paths 17H, 17V as described previously. However, for data transfers between SPICs on different buses, e.g. SPICs A and D in the array of FIG. 2, the selective routing function in SPIC C (or SPIC B) is implemented at the appropriate time to transfer data between the horizontal and vertical buses to which it is connected. For example, assuming data is to be transferred from SPIC A to SPIC D via SPIC C, this data will be supplied on the H bus to the input register 22H of SPIC C. The H-V control bit in the appropriate instruction for SPIC C is set such that, in the next tick, the multiplexer 32V connects the output of the register 22H to the output driver 20V, the set H-V control bit serving to enable the output driver so that the data appears on the V bus and is available for input by SPIC D. Equally, if data is to be transferred from SPIC D to SPIC A, the V-H control bit in the appropriate instruction in SPIC C is set such that when the data received from the V bus is output by the register 22V in SPIC C, the multiplexer 32H supplies the data to the output driver 20H which is enabled to output the data to the H bus.

The above process is illustrated diagrammatically in FIG. 7 for the data transfer from SPIC A to SPIC D. Here, in tick 0, instruction 0 read from the program RAM 5 of SPIC A is an instruction to output data from its data RAM 7 to the H bus. In instruction 0 for SPIC C, the H-V control bit is set. In tick 1, instruction 0 propagates through pipeline stage 1 in SPICs A and C and instruction 1 is read from the program RAM in SPIC D. This instruction is an instruction to input data from the V bus. After propagation through the pipeline stages of SPIC A, the data will be output by SPIC A to the H bus in tick 4. In this tick, the data is registered by the input register 22H of SPIC C. In the next tick, tick 5, the set H-V control bit of instruction 0 in SPIC C has propagated through the pipeline to the multiplexer 32V and output driver 20V in the output data path 17V of SPIC C. Thus, the data is routed from the input register 22H via the multiplexer 32V and output driver 20V to the V bus. During this tick, the data on the V bus is registered by the input register 22V of SPIC D and then propagates through pipeline stages 5 to 7 in this SPIC to be written to the data RAM 7 of SPIC D in tick 8.

Thus, in the above embodiment, the transfer of data between SPICs on different data buses requires only nine ticks, ie. only one tick more than for transfer of data between SPICs sharing a data bus. The extra tick required for such communications results from the connection of the inputs of the multiplexers 32H and 32V to the outputs, rather than the inputs, of the input registers 22H and 22V in FIG. 6. This arrangement is preferred to ensure there is sufficient set-up time for data for faithful transfer of data between the buses.

Note that it is possible to have both the H-V and the V-H bit set in the same SPIC at the same time, and that if the bits alternate then so will the data.

Not only does the selective routing function described above allow much faster communication between SPICs on different buses, which in turn facilitates efficient programming of the array as a whole at set-up, but the internal processing circuitry of SPIC C is not occupied during the transfer. That is to say, instruction 0 for SPIC C in FIG. 7 may be utilised for another function, for example any internal arithmetic operation or an input or output instruction using the V bus. Since the processing resources of SPIC C remain available during the routing operation, the routing facility dramatically reduces the constraints on the programming operation for the array as a whole. The processing power and overall efficiency of the array can therefore be substantially increased.

It will of course be appreciated that the selective routing function can be applied to processing arrays where the processors 4 are connected to more than two data buses by appropriate extension of the implementation described above.

As previously described, all bus transfers in the parallel processing array occur at prearranged times in the audio sample period in accordance with the instruction sequences stored in the SPICs. In view of the numerous processing operations that must be performed by the array as a whole, it will be appreciated that the task of selecting the bus transfer times can be extremely complicated. FIG. 8 illustrates the type of problem that may arise where the available resources do not allow simple implementation of a given processing requirement. In the Figure, the available resources for two SPICs, SPIC A and SPIC B, and the available resources of the V bus connecting these SPICs are illustrated for a portion of the audio sample period after partial programming of the array. Consider that in this situation a data transfer from SPIC A to SPIC B is required. Instructions n to n+11 of SPIC A have all been allocated except for instruction n+1 which is available for use an OUT instruction to the V bus. If allocated as an OUT instruction, in view of the internal pipelining, the data generated by the OUT instruction would appear on the V bus four ticks later, ie. in tick n+5, as indicated by the asterisk in the SPIC A resources column. However, the V bus is occupied for all of ticks n to n+11 except for tick n+8.

Similarly, all the instructions for SPIC B from tick n to n+11 have been allocated except for tick n+7 which is available for use as an IN instruction from the V bus. In view of the internal pipelining, an IN instruction in tick n+7 will be effective to input data from the V bus in tick n+11 as indicated by the asterisk in the SPIC B resources column. Again, the V bus is not free for this tick.

In the previously proposed system, constraints such as those described above can seriously effect the processing efficiency of the array since alternative methods must be found to effect the required SPIC A to SPIC B transfer, for example by transferring the data via other SPICs, utilising processing resources of those SPICs and slowing down the transfer, or by delaying the transfer until a later stage in the data sample period thus reducing the time available for any necessary further processing of that data.

In preferred embodiments of the present invention, selectively operable output delay means are provided in each SPIC to enable data supplied to the I/O sections following an instruction to output that data to a bus to be delayed until a cycle of the clock signal when the bus is free. Further, selectively operable input delay means are preferably provided in each SPIC to enable data supplied by the bus to the I/O sections to be delayed until input of that data to the internal processing circuitry of the SPIC can be effected by an IN instruction.

To control operation of the output delay means, two output delay control bits (OD) are added at the beginning of the instruction word as illustrated in FIG. 4*b*. One of these bits (ODH) controls delaying of the output to the H bus in the I/O section 16H, and the other bit (ODV) controls delaying of the output to the V bus in the I/O section 16V. These control bits propagate through the pipeline stages of the control bus 30 in FIG. 3 and are supplied to the I/O sections 16H, 16V from pipeline stage 4.

Figure 9:
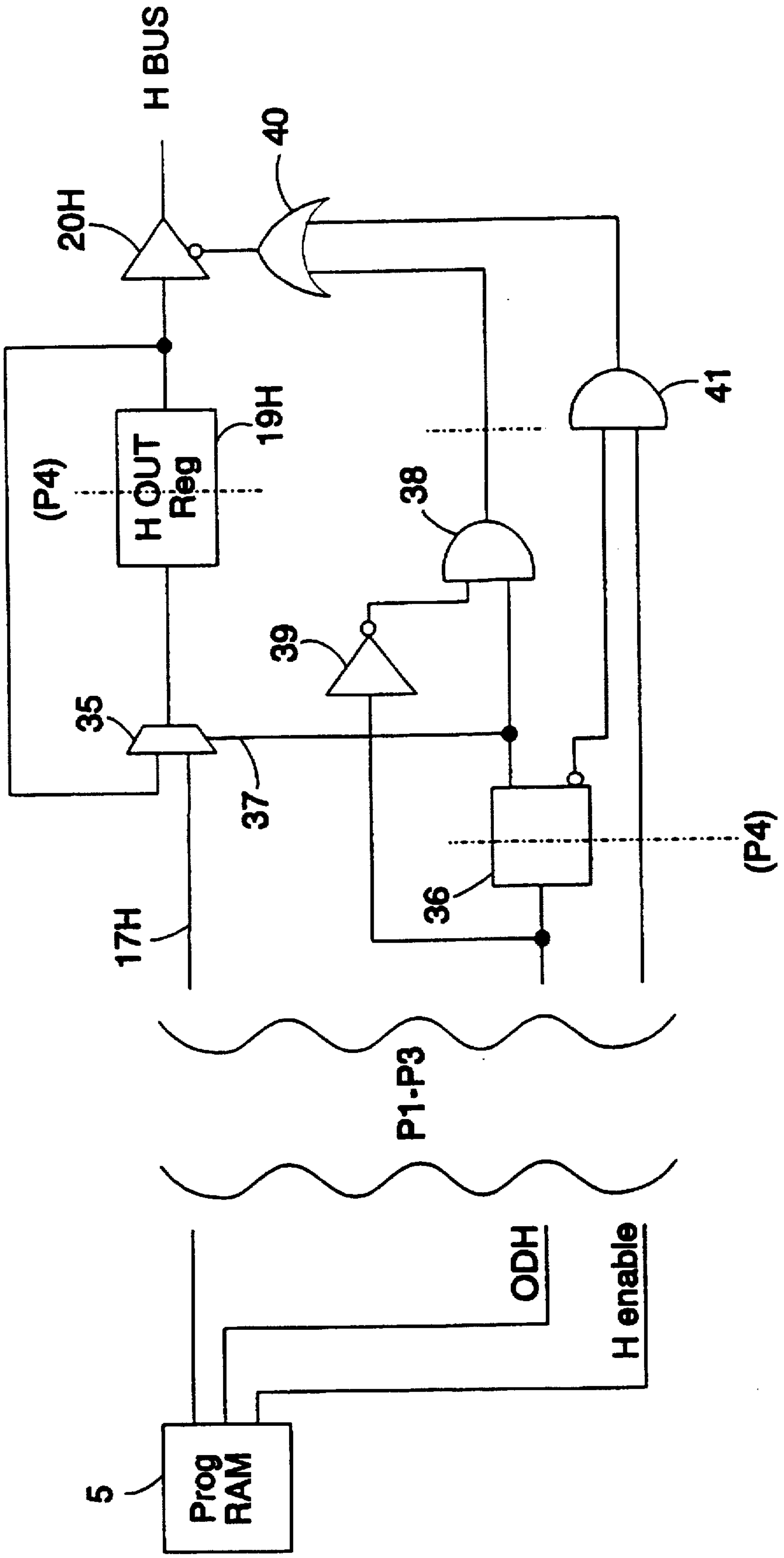
FIGS. 9 and 10 illustrate in detail respective parts of the structure of the SPIC of FIG. 3*a* for implementing the delay functions of FIG. 8.

FIG. 9 shows the arrangement of part of the I/O section 16H for implementing the selective output delay function for the H bus. The arrangement and operation of the I/O section 16V to effect the output delay function for the V bus is entirely equivalent. FIG. 9 illustrates the data and control paths from the program RAM 5 to the output path 17H of the I/O section 16H, with pipeline stages 0 to 2 (involving pipeline registers P1 to P3) being indicated schematically in the figure. As previously described, the output register 19H corresponds to equivalent pipeline register (P4).

As illustrated, a multiplexer 35 is connected in the output data path 17H before the output register 19H. The output of the multiplexer forms the input to the output register 19H, and one input of the multiplexer 35 is provided by the data path 17H from the internal processing circuitry. The other input of the multiplexer 35 is connected to the output of the register 19H. Note that the pipeline register (P4) does not extend across the connection between the output of the register 19H and the input of the multiplexer 35 so that there is no pipeline register in this connection. Two branches of the control line 30 from the program RAM 5 are indicated individually in the Figure. One of these supplies the output delay bit ODH to the I/O section, and the other supplies the output enable signal (H enable) for the output driver 20H. In this embodiment the output driver 20H is enabled when the H enable bit is 1 (and disabled when 0). Similarly, the output delay function is implemented when the output delay control bit ODH is 1 (and not implemented when 0).

As shown, after pipeline register P3, the output delay control bit line forms the input to a register 36 which effects a 1-tick delay and therefore corresponds to equivalent pipeline register (P4). A pipeline register is also connected in the H enable control line as indicated by the extension of the line representing the pipeline register (P4) over this control line. The register 36 has a non-inverting output which is connected to a control input 37 of the multiplexer 35 for controlling which of the two multiplexer inputs is connected to the multiplexer output. The non-inverting output of the register 36 also forms one input to an AND gate 38. The other input of the AND gate 38 is connected via an inverter 39 to the ODH control line at the input to the register 36, there being no pipeline delay in this connection. The output of the AND gate 38 is connected, via a pipeline register, to one input of an OR gate 40 the output of which forms the control input to the output driver 20H.

The register 36 also has an inverting output connected to one input of a further AND gate 41. The other input of this AND gate 41 is the H enable control line after equivalent pipeline register (P4). The output of the AND gate 41 forms the second input to the OR gate 40.

Consider first a normal OUT instruction to the H bus which is not to be delayed, ie. for which the control bit ODH is 0. As the data to be output is supplied to the output register 19H, the H enable bit, which is set to 1 for the OUT instruction, reaches pipeline register (P4) and the control bit ODH=0 is input to the register 36. In the next tick, the data is output by the register 19H to the output driver 20H, and the ODH=0 is fed to the control input 37 of the multiplexer 35 so that the data output by the register 19H is not fed back via the multiplexer to the register input. During this tick, the set H enable bit is supplied via the AND gate 41 and OR gate 40 to enable the output driver 20H so that the data appears on the H bus. If however the output control bit ODH had been set to 1 for that instruction to delay the output data, during tick 4, ODH=1 would appear on the control input 37 of the multiplexer 35 switching the multiplexer to feed the data output by the register 19H back to the register input. In this case, it is necessary to gate out the H enable bit (which is set for all OUT instructions) to prevent enabling of the output driver 20H. This is achieved by the AND gate 41 since the inverting output of the register 36 will be zero.

If the output is to be delayed for more than one tick, then the output control bit ODH is set in the appropriate number of instructions following the OUT instruction. (Note that these further instructions can be any instruction other than an OUT instruction to the H bus). Thus, the output control bit ODH is set in an appropriate number of instructions to delay the data to be output until a tick when the H bus is free. During this tick, the data which has, up till then, been repeatedly fed back to the register 19H, must be output to the H bus. Thus, in view of the pipelining, the instruction which was read out from the program RAM 5, four ticks earlier (which again may be any instruction other than an OUT to H bus instruction) has its control bit ODH set to zero. Since this instruction will not be an OUT to H bus instruction, the H enable bit will not be set so it is necessary to regenerate this bit to enable the output driver 20H to output the delayed data. This achieved by means of the AND gate 38 and inverter 39 which effectively detect a transition from 1 to 0 on the ODH control line and, as will be seen from analysis of the logic, generate a 1 which is supplied via the OR gate 40 to the control input of the output driver 20H as the enable signal.

The structure of the output data path 17V in the V bus of the I/O section 16V is equivalent to that shown in FIG. 9 for the H bus. The setting of the output delay control bit ODV in successive instructions to remedy the problem shown in FIG. 8 of SPIC A outputting data to the V bus is shown by the column headed ODV in FIG. 8. Thus, SPIC A has an OUT to V bus instruction available in tick n+1 which would place the data on the V bus in tick n+5. Since the V bus is not free until three ticks later, the data to be output must be delayed in the output section 16V by three ticks. Accordingly, the output delay bit ODV for the OUT instruction in tick n+1 is set to 1 as are the bits ODV in the next two instructions (which may be any instructions other than OUT to V bus instructions). Thus, the data will be delayed in the output data path 17V for a total three ticks and output to the V bus in tick n+8 when the bus is free.

For the selective delayed input function, two input delay bits ID are added at the beginning of the instruction word as illustrated in FIG. 4*b*. One of these bits, IDH, controls the delaying of input data from the H bus, and the other control bit, IDV, controls delaying of input data from the V bus. These controls bits again propagate through the pipeline stages of the control bus 30 in FIG. 3*a*, and are supplied to the I/O sections 16H, 16V from pipeline stage 5.

Figure 10:
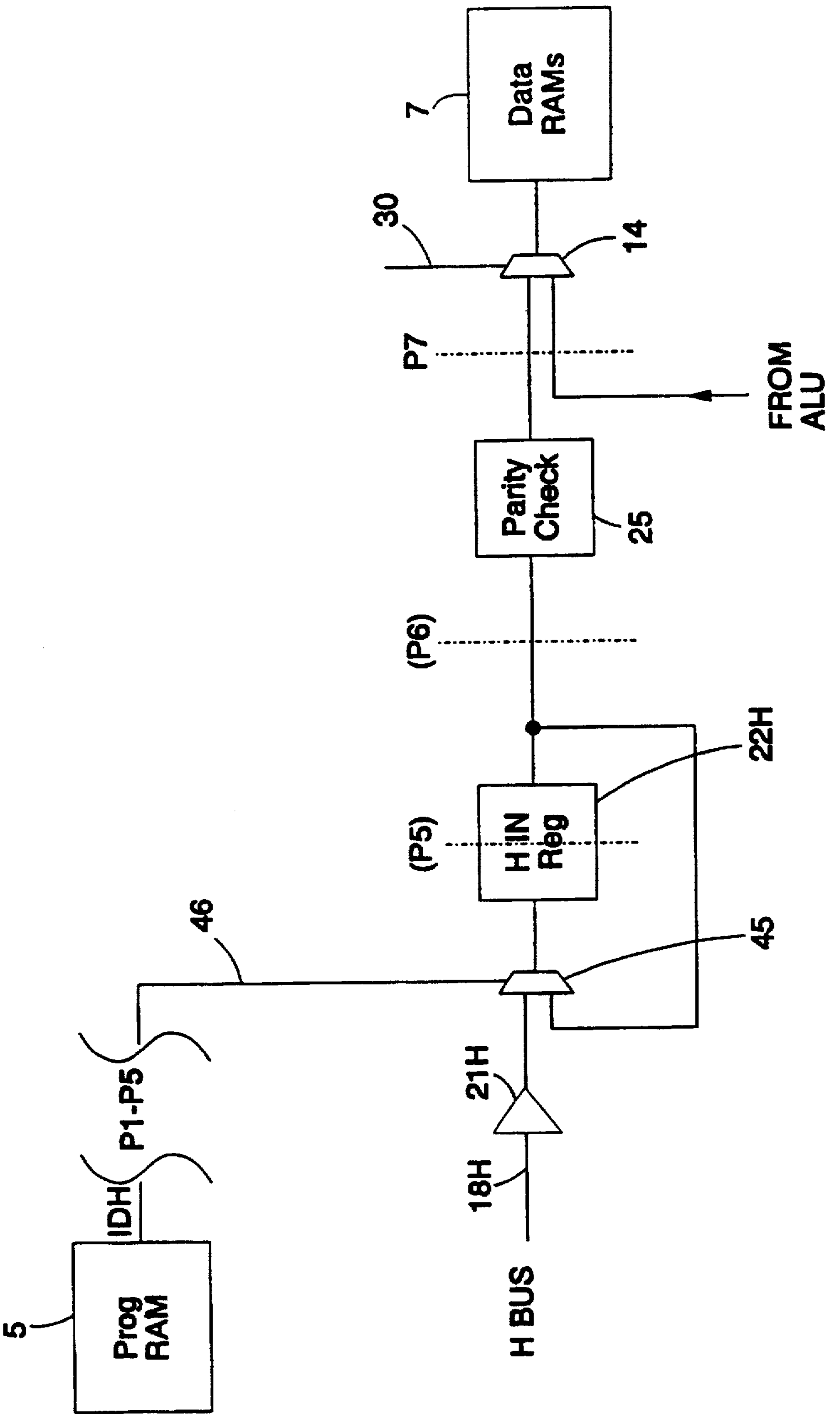

FIG. 10 illustrates the arrangement of the input data path 18H of the I/O section 16H for implementing the selective delay function for data input from the H bus. As illustrated in the Figure, a multiplexer 45 is connected in the input data path 18H, the output of the multiplexer 45 forming the input to the register 22H constituting equivalent pipeline register (P5). One input of the multiplexer 45 is provided by the output of the input buffer 21H. The other input of the multiplexer 45 is connected directly (ie. not via a pipeline register) to the output of the register 22H.

A branch of the control line 30 from the program RAM 5 supplies the input delay control bits IDH, via pipeline registers P1 to P5, to the control input 46 of the multiplexer 45. If the control bit IDH is not set, ie. zero, the multiplexer 45 connects the input buffer 21H to the register 22H. If IDH=1, the multiplexer 45 feeds the output of the register 22H back to its input. Thus, consider the situation where data to be processed by the SPIC is available on the H bus in tick n, but the available instruction to input data from the H bus is read out of the program RAM in tick n−2. In view of the internal pipelining, the IN instruction in tick n−2 is effective to input data on the bus in tick n+2 which means that the data to be processed is present on the bus two ticks too early. The data present on the bus in tick n must therefore be delayed in the input data path 18H by two ticks. To achieve this, the instructions which are read out of the program RAM 5 in ticks n−4 and n−3 (which may be any instructions other than IN instructions) have their IDH control bits set to 1. During tick n, the data on the H bus is supplied via the input register 21H and multiplexer 45 to the register 22H. In tick n+1, the set control bit IDH for instruction n−4 has propagated through pipeline registers P1 to P5 to the control input 46 of the multiplexer 45. During tick n+1 therefore, the data output by the register 22H is fed back via the multiplexer 45 to the register input. Similarly, in tick n+2, the set control bit IDH for instruction n−3 controls the multiplexer 45 again to feed back the data to the input of register 22H. In tick n+3, the input instruction in tick n−2 has propagated through pipeline stages P1 to P5 in the control line 30 so that the multiplexer 45 switches out the feedback connection from the output of the register 22H. The data output by the register 22H therefore propagates as normal through pipeline register (P6), parity checking 25, and pipeline register P7 to the multiplexer 14 which is controlled by the normal input enable signal to supply the data to the data RAMs 7.

The structure and operation of the input data path 18V in the V bus I/O section is equivalent to that for the H bus I/O section described above. The setting of the input delay control bits IDV in successive instructions to solve the problem shown in FIG. 8 for an input to SPIC B from the V bus is shown in the IDV column of FIG. 8. Here, an IN from V bus instruction is available in SPIC B in tick n+7. This instruction is effective to input data which is on the bus in tick n+11, three ticks after the required data is actually present on the bus. Thus, the input delay bits IDV are set to 1 in the three instructions preceding the input instruction, ie. instructions n+4, n+5 and n+6. In tick n+8 the data is supplied to the input register 22V in the V bus I/O section. The set IDV bits in instructions n+4 to n+6 serve to feed this data back to the register inputs during ticks n+9 to n+11, and in the next tick, input of the data progresses in accordance with the normal IN instruction n+7 for which IDV=0.

It will be appreciated that the delayed IN and delayed OUT facilities significantly reduce the number of constraints on the array programming operation and provide for substantial improvement in the efficiency of the processing array. While embodiments of the invention may include one or more of the delayed IN, delayed OUT, and selective routing functions, even in the preferred case where all three facilities are provided, the instruction word length need only be increased by six bits as illustrated in FIG. 4*b*.

For high overall efficiency of the parallel processing array, it is desirable to have an efficient memory arrangement over the array as a whole and to make the most practical use possible of the memory capacity of the data RAMs 7. Certain processing operations require storage of large quantities of data over many audio sample periods. For example, to produce certain effects, such as echo or reverb effects for example, storage of multiple audio samples for relatively long periods can be required. As a further example, it may be necessary to store data in the form of look-up tables for use in particular operations, e.g. for certain interpolation functions. In preferred embodiments of the present invention, additional memories, preferably 1 Mb dynamic random access memories (DRAMs) are provided for such purposes. To reduce costs, however, in embodiments of the present invention each DRAM is shared by more than one processor. While shared external memories have been used for communication of data between different processors in processing systems, so that each processor can read data written to the memory by another processor, in embodiments of the present invention each processor uses the DRAM simply as additional external storage capacity. Thus, efficient use of the internal SPIC data RAMS can be achieved by using the DRAM to store data such as the effects data or look up tables mentioned above, while processor to processor communication is achieved by the much faster method of transfer via the H and V buses described earlier. Moreover, the arrangement is particularly simple and cost-efficient since each DRAM may be shared by more than one, for example two, SPICs, and the memory is not partitioned, the two processors simply being programmed to use different address space in the memory.

Figure 11:
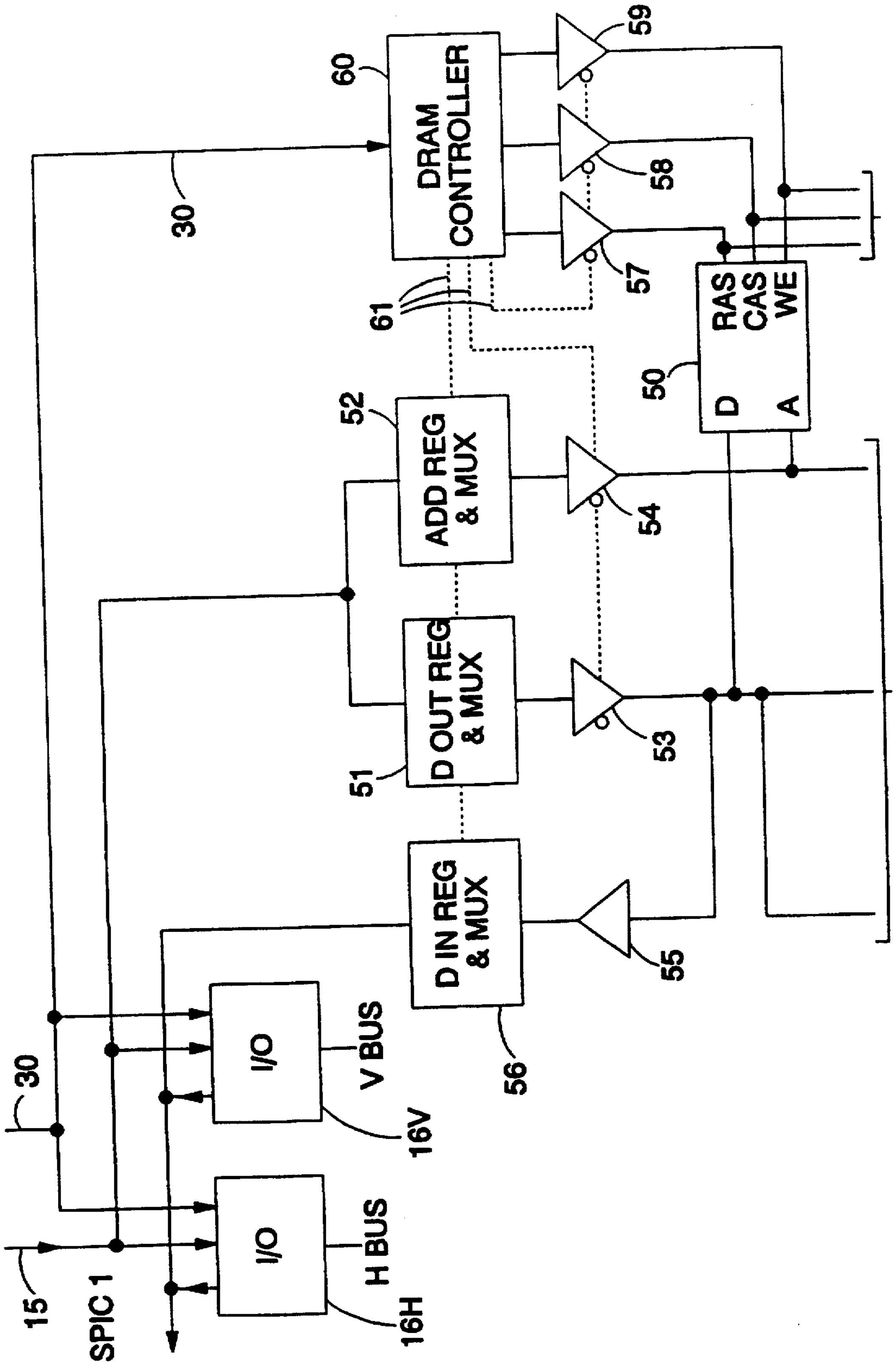
FIG. 11 illustrates in detail connection of the SPIC of FIG. 3*a* with an external DRAM in preferred embodiments of the invention.

FIG. 11 illustrates schematically the connection of a DRAM 50 between two SPICs, SPIC 1 and SPIC 2, in a preferred embodiment of the invention. In the Figure, the I/O sections 16H and 16V and the control bus 30 of SPIC 1 are shown to illustrate the connection of SPIC 1 to the DRAM 50 via the DRAM I/O and control circuitry for SPIC 1. The DRAM I/O and control circuitry for SPIC 2 is omitted for clarity but is entirely equivalent to that for SPIC 1, the connection thereof to the DRAM 50 being as indicated in the figure. As illustrated, the output 15 of the MUX block 9 of SPIC 1 is connected to a DRAM data output register and multiplexer (D OUT REG & MUX) 51 and a DRAM address register and multiplexer (ADD REG & MUX) 52. The outputs of these registers 51 and 52 are connected via respective tri-state (or "three-state") buffers 53 and 54 to the data and address ports (D and A) of the DRAM 50. The DRAM data port is also connected via an input buffer 55 to a DRAM data input register and multiplexer (D IN REG & MUX) 56 the output of which is connected with the input paths from the I/O sections 16H, 16V to the parity checker 25.

An extension of the control line 30 to the I/O sections 16H, 16V is connected to a DRAM controller 60 which generates the usual control signals RAS (row address strobe). CAS (column address strobe) and WE (write enable) for supply on respective DRAM control outputs thereof to the RAS. CAS and WE inputs of the DRAM 50. Further tri-state buffers 57, 58 and 59 are connected in the RAS, CAS and WE outputs of the DRAM controller 60 as illustrated. The DRAM controller 60 controls operation of the DRAM I/O circuitry and the tri-state buffers 57 to 59 as indicated by the control lines 61 (shown as broken lines in the figure) and discussed further below.

The DRAM I/O and control circuitry for SPIC 2 is identical to that for SPIC 1. Thus, the DRAM controller of SPIC 2 is connected via tri-state buffers to the RAS, CAS and WE inputs of the DRAM 50, and the DRAM I/O circuitry for SPIC 2 is connected to the DRAM data and address ports D, A as indicated in the figure.

For each SPIC, DRAM accesses are considered to be I/O accesses in that: the DRAM is external to the SPIC: control for DRAM accesses uses the same bits of the control data field of the instruction word that H and V bus accesses use; and DRAM accesses are not possible in the same tick as an H or V bus access. However, two SPIC instructions are required for each DRAM access. For a DRAM write, the first instruction generates the data to be written to the DRAM, and the second instruction (which can be the very next instruction but is not necessarily so) generates the DRAM address data. For a DRAM read, the first instruction generates the DRAM address, and the second instruction inputs the data read from the DRAM.

Considering first an instruction in SPIC 1 to write data to the DRAM 50, the first instruction (DATA OUT to DRAM) retrieves the data to be written to the DRAM from the data RAMs 7 in the SPIC. This data is supplied to the data register and multiplexer 51 three ticks after the instruction is read from the program RAM 5 in the SPIC, and the control bits of the instruction word indicating that the instruction is a DATA OUT to DRAM instruction are supplied to the DRAM controller 60 via the control line 30 to indicate the output of data to be written to the DRAM. After the instruction generating the DRAM data, a further instruction (ADDRESS OUT TO DRAM) retrieves the appropriate DRAM address from the data RAMs 7 in the SPIC, and the DRAM address indicator control bits are supplied to the DRAM controller 60 via the control line 30. (In this regard, the DRAM address, if known, may have been written directly from the control processor 26 via a connection (not shown) to the data RAM section 7, or, more likely, the DRAM address will have been generated and stored in the data RAM section 7 as a result of an earlier processing operation).

Although not shown in the simplified schematic of FIG. 11, in this example the input to the D OUT REG & MUX 51 is 32 bits wide and the input to the ADD REG & MUX 52 is 20 bits wide. The DRAM data and address inputs are 8 and 10 bits wide respectively. The output by SPIC 1 of a DRAM address following a DRAM data output triggers a microsequence in which the DRAM controller 60 controls the ADD REG & MUX 52 to output two successive 10-bit bytes of the address (ie row address and column address), and the D OUT REG & MUX 51 to output four successive 8-bit bytes of the data. The address and data are supplied via the tri-state buffers 54 and 53 to the address and data ports A, D of the DRAM 50, the RAS, CAS and WE signals being generated by the controller 60 and supplied via the tri-state buffers 57 to 59 to the corresponding inputs to the DRAM. Four successive 8-bit bytes of data are thereby written into consecutive addresses in the DRAM. After driving the appropriate buffers 53, 54 and 57 to 59 during this process, the DRAM controller 60 disables, or tri-states, these buffers (ie the buffers are set to their third state: open circuit). Equally, the output buffers in the DRAM I/O and control circuitry of SPIC 2 are tri-stated during this process so that DRAM accesses by SPIC 2 are locked out.

The operation of the DRAM circuitry proceeds independently of the continuing processing operations of the SPIC, the timing being such that if the DRAM address is output by the SPIC in tick n, the fourth byte of data is written into the DRAM in tick n+13.

Considering next a DRAM read access by SPIC 1, the first instruction outputs the DRAM address to the ADD REG & MUX 52, the control data indicative of a DRAM address output being supplied to the DRAM controller 60 via the control line 30. Since there has been no DRAM data output preceding this address output, this indicates that a DRAM read access is to be performed. The controller 60 thus initiates a micro-sequence wherein the 10-bit bytes of address data (row and column address) are output by the ADD REG & MUX 52, via the tri-state buffer 54, to the address port A of the DRAM, the RAS, CAS and WE signals being supplied via the buffers 57 to 59 to the DRAM whereby four successive 8-bit bytes of data are supplied via the input buffer 55 to the D IN REG & MUX 56. During this process, the buffer 53 is tri-stated so that the data output path from SPIC 1 is disconnected from the DRAM data part. Similarly, the equivalent buffers 53, 54 and 57 to 59 for SPIC 2 are tri-stated during this process. After controlling the read access as described above, the buffers 54 and 57 to 59 are again tri-stated by the DRAM controller 60 to disable these outputs.

Thus the first instruction in SPIC 1 for a read access results in the 32 bits of data being supplied to the D IN REG & MUX 56. A subsequent instruction in SPIC 1 to input data from the DRAM then receives all 32 bits of data output by the D IN REG & MUX 56 (under control of the sequence controller 60 which is triggered by the control data on control line 30 indicating an input from DRAM) and writes that data to the internal data RAM 7 of the SPIC. Here, the timing is such that if the DRAM read address is output in tick n, the data is available at the output of the D IN REG & MUX 56 in tick n+14, so that the corresponding DRAM data input instruction must not be before tick n+9.

DRAM accesses by SPIC 2 are entirely equivalent to the procedure described above. It will of course be appreciated that DRAM accesses by either SPIC must not overlap. As is evident from the above, it is the DRAM address accesses that actually control the DRAM. Any DRAM address access by one SPIC in tick n means that the next DRAM address access (read or write) by either SPIC must not be before tick n+12. Thus, one access may be made to the DRAM by either SPIC per 12 ticks. Overlap between DRAM accesses is prevented by separating DRAM access instructions in the SPICs by at least 12 ticks on programming.

As noted above, the SPICs 1 and 2 are programmed not to use conflicting address space in the DRAM, and though the DRAM is shared, the connections to one SPIC are tri-stated while a DRAM access is performed by the other SPIC. (Of course, it will be appreciated that, if desired, a DRAM 50 may be shared by more than two SPICs). Thus, a particularly simple and efficient arrangement is provided whereby substantial additional storage capacity is available to each SPIC while providing only one DRAM. Moreover, the DRAM circuitry is entirely self-contained, enabling the internal processing and H and V bus I/O in both SPICs to continue as normal in parallel with any DRAM access.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Parallel processing apparatus comprising:

an array of data processors arranged to operate synchronously;

a plurality of data buses; and each data processor having first and second I/O means for transferring data between a respective processor and a respective pair of data buses, a plurality of data processors being connected to each of the data buses and each data processor being connected, via said first and second I/O means, to a different pair of data buses, wherein each processor includes selectively operable routing means for inputting said data from a first processor via one of said respective pair of buses to said first I/O means and selectively routing said data directly from said first I/O means through said second I/O means to a second processor via the other of said respective pair of buses.

2. Apparatus as claimed in claim 1, wherein each processor further comprises a program memory, each processor performing a sequence of operations in accordance with a sequence of instructions stored in said program memory, said instructions including routing control bits for controlling operation of said routing means.

3. Apparatus as claimed in claim 2, wherein each instruction includes two routing control bits, each routing control bit controlling selective transfer of data from one of the respective pair of data buses connected to that processor to the other data bus of the respective pair.

4. Apparatus as claimed in claim 1, wherein the routing means comprises first and second multiplexers, each arranged for selective transfer of data through said first I/O means from one of the respective pair of data buses through said second I/O means to the other data bus of the respective pair.

5. Apparatus as claimed in claim 4, wherein each instruction includes two routing control bits, each bit controlling selective transfer of data from one of the respective pair of data buses connected to that processor to the other data bus of the respective pair, and wherein each multiplexer is controlled by one of said routing control bits.

6. Apparatus as claimed in claim 4, wherein the first and second I/O means each comprise an input data path and an output data path, and wherein each of the first and second multiplexers is arranged selectively to interconnect the input path of one I/O means and the output path of the other I/O means.

7. Apparatus as claimed in claim 6, further comprising a data input register connected in each data input path of each I/O means, and wherein each multiplexer is arranged to interconnect the output of the data input register of one I/O means to the output path of the other I/O means.

8. Digital audio signal processing apparatus comprising parallel processing apparatus as claimed in claim 1.

9. Apparatus as claimed in claim 1, wherein said array of data processors is a two dimensional array of horizontal data buses connected to said first I/O means of each data processor and vertical data buses connected to said second I/O means of each data processor, wherein said routing means routes said data of said first data processor from a respective horizontal data bus via said first I/O means directly to said second I/O means for output via a respective vertical data bus to said second data processor.

10. Apparatus as claimed in any one of claim 1, wherein a plurality of the data processors share an external memory having an address port, a data port and control inputs, each processor sharing the memory having data and address outputs connected to the data and address ports of the memory and a memory controller, having control outputs connected to the control inputs of the memory, for controlling accessing of the memory by that processor, wherein the processors sharing the memory are configured to access respective different address areas of the memory, and wherein the memory controller of each processor is arranged to disable the data, address and control outputs to the memory after operation thereof during a memory access by that processor.

11. Apparatus as claimed in claim 10, wherein respective tri-state buffers are connected in the data, address and control outputs of each processor connected to the external memory for disabling the outputs under control of the memory controller.

12. Parallel processing apparatus comprising an array of data processors arranged to operate synchronously in accordance with a clock signal, each processor having data I/O means connecting the respective processor to at least one data bus to which a plurality of the processors are connected, and each processor having a program memory and being arranged to perform a sequence of operations in accordance with a sequence of instructions stored in said program memory of the processor, wherein each processor includes selectively operable output delay means for delaying data supplied to the I/O means in response to an instruction from said program memory to delay said output, following an instruction to output that data to the bus, until a cycle of the clock signal when the bus is free.

13. Apparatus as claimed in claim 12, wherein each processor has first and second data I/O means connecting the processor to respective data buses, a plurality of processors being connected to each of the data buses and each processor being connected, via the data I/O means, to a different pair of data buses, wherein each data I/O means has associated selectively operable output delay means for delaying data supplied to the I/O means until a cycle of the clock signal when the associated bus is free.

14. Apparatus as claimed in claim 13, wherein each said instruction includes a respective output delay control bit for controlling operation of the output delay means of each data I/O means of the processor, wherein, the instructions are implemented in successive cycles of the clock signal, and wherein, when data supplied to a said I/O means is to be delayed by a given number of clock cycles, the associated output delay control bit of a corresponding number of successive instructions, starting with the instruction to output that data, is set to effect the delay.

15. Apparatus as claimed in claim 14, wherein each data I/O means of said respective processor includes an output driver, and each said instruction to output data to the bus connected to the I/O means includes an output enable bit for enabling the output driver to supply data to the bus, and wherein the output delay means is arranged to prevent enabling of the output driver by the enable bit of an instruction if the associated output delay control bit of the instruction is set.

16. Apparatus as claimed in claim 15, wherein the output delay means is arranged to enable the output driver to output data to the bus following delaying of that data by the output delay means.

17. Apparatus as claimed in claim 12, wherein the I/O means comprises an output register for data to be output to the bus, and wherein the output delay means comprises selectively operable means to feed back the register output to the register input during a cycle of the clock signal.

18. Apparatus as claimed in claim 17, wherein the output delay means comprises a multiplexer arranged for selectively supplying the register output to the register input.

19. Apparatus as claimed in claims 12, wherein the said instructions include output delay control bits for controlling operation of the output delay means.

20. Apparatus as claimed in claim 19, wherein each said instruction includes a single output delay control bit for controlling operation of the output delay means of the respective processor, wherein the instructions are implemented in successive cycles of the clock signal, and wherein, when data supplied to the I/O means is to be delayed by a given number of clock cycles, the output delay control bit of a corresponding number of successive instructions, starting with the instruction to output that data, is set to effect the delay.

21. Apparatus as claimed in claim 20, where the data I/O means of said respective processor includes an output driver, and each said instruction to output data to the bus connected to the I/O means includes an output enable bit for enabling the output driver to supply data to the bus, and wherein the output delay means is arranged to prevent enabling of the output driver by the output enable bit of an instruction if the output delay control bit of the instruction is set.

22. Apparatus as claimed in claim 21, wherein the output delay means is arranged to enable the output driver to output data to the bus following delaying of that data by the output delay means.

23. Apparatus as claimed in claim 12, wherein a plurality of the data processors share an external memory having an address port, a data port and control inputs, each processor sharing the memory having data and address outputs connected to the data and address ports of the memory and a memory controller, having control outputs connected to the control inputs of the memory, for controlling accessing of the memory by that processor, wherein the processors sharing the memory are configured to access respective different address areas of the memory, and wherein the memory controller of each processor is arranged to disable the data, address and control outputs to the memory after operation thereof during a memory access by that processor.

24. Parallel processing apparatus comprising an array of data processors arranged to operate synchronously in accordance with a clock signal, each processor having data I/O means connection a respective processor to at least one data bus to which a plurality of said processors are connected, and each processor having a program memory and being arranged for performing a sequence of operations in accordance with a sequence of instructions stored in said program memory of the respective processor, wherein each processor includes selectively operable input delay means for delaying data supplied by the bus to the I/O means in response to an instruction from said program memory to delay said input until input of that data can be effected by an instruction.

25. Apparatus as claimed in claim 24, wherein each processor has first and second data I/O means connecting a respective processor to respective data buses, a plurality of processors being connected to each of the data buses and each processor being connected, via the data I/O means, to a different pair of data buses, wherein each data I/O means has associated selectively operable input delay means for delaying data supplied to the I/O means until input of that data can be effected by said instruction.

26. Apparatus as claimed in claim 25, wherein each said instruction includes a respective input delay control bit for controlling operation of the output delay means of each data I/O means of the respective processor, wherein the instructions are implemented in successive cycles of the clock signal, and wherein, when data received from the bus by said I/O means is to be delayed by a given number of clock signals, the associated input delay control bit of a corresponding number of successive instructions immediately preceding the instruction to input that data is set to effect the delay.

27. Apparatus as claimed in claim 24, wherein the data I/O means comprises an input register for data received from the bus, and wherein the input delay means comprises selectively operable means to feed back the register output to the register input during a cycle of the said clock signal.

28. Apparatus as claimed in claim 27, wherein the input delay means comprises a multiplexer arranged for selectively supplying the register output to the register input.

29. Apparatus as claimed in claim 24, wherein the said instructions include input delay control bits for controlling operation of the input delay means.

30. Apparatus as claimed in claim 29, wherein each said instruction includes a single input delay control bit for controlling operation of the input delay means of the respective processor, wherein the instructions are implemented in successive cycles of the clock signal, and wherein, when data received from the bus by the I/O means is to be delayed by a given number of clock cycles, the input delay control bit of a corresponding number of successive instructions immediately preceding the instruction to input that data is set to effect the delay.

31. Apparatus as claimed in claim 24, wherein a plurality of the data processors share an external memory having an address port, a data port and control inputs, each processor sharing the memory having data and address outputs connected to the data and address ports of the memory and a memory controller, having control outputs connected to the control inputs of the memory, for controlling accessing of the memory by that processor, wherein the processors sharing the memory are configured to access respective different address areas of the memory, and wherein the memory controller of each processor is arranged to disable the data, address and control outputs to the memory after operation thereof during a memory access by that processor.

* * * * *